United States Patent
Nallagatla et al.

(10) Patent No.: US 8,555,043 B1
(45) Date of Patent: *Oct. 8, 2013

(54) DYNAMICALLY UPDATING A COMPUTER SYSTEM FIRMWARE IMAGE

(75) Inventors: Purandhar Nallagatla, Duluth, GA (US); Harikrishna Doppalapudi, Tenali (IN)

(73) Assignee: American Megatrends, Inc., Norcross, GA (US)

( * ) Notice: Subject to any disclaimer, the term of this patent is extended or adjusted under 35 U.S.C. 154(b) by 1061 days.

This patent is subject to a terminal disclaimer.

(21) Appl. No.: 12/539,132

(22) Filed: Aug. 11, 2009

Related U.S. Application Data (63) Continuation of application No. 11/479,725, filed on Jun. 30, 2006, now Pat. No. 7,590,835.

(51) Int. Cl.
*G06F 9/44* (2006.01)

(52) U.S. Cl.
USPC ............... 713/1; 713/2; 713/156; 717/168; 709/203

(58) Field of Classification Search
USPC .............. 713/1, 2, 156; 717/168; 709/203
See application file for complete search history.

(56) References Cited

U.S. PATENT DOCUMENTS

| | | | |
|---|---|---|---|
| 5,210,854 A | 5/1993 | Beaverton et al. | |
| 5,623,604 A | 4/1997 | Russell et al. | |
| 6,081,850 A | 6/2000 | Garney | |
| 6,253,300 B1 | 6/2001 | Lawrence et al. | |
| 6,360,362 B1 | 3/2002 | Fichtner et al. | |
| 6,581,157 B1 | 6/2003 | Chiles et al. | |
| 6,604,236 B1 | 8/2003 | Draper et al. | |
| 6,631,520 B1 | 10/2003 | Theron et al. | |
| 6,640,334 B1 | 10/2003 | Rasmussen | |
| 6,678,741 B1 | 1/2004 | Northcutt et al. | |
| 6,836,885 B1 | 12/2004 | Buswell et al. | |
| 6,898,768 B1 | 5/2005 | Theodossy et al. | |
| 6,944,854 B2 | 9/2005 | Kehne et al. | |
| 6,954,929 B2 | 10/2005 | Erickson et al. | |
| 6,976,163 B1 | 12/2005 | Hind et al. | |
| 7,007,159 B2 | 2/2006 | Wyatt | |
| 7,055,148 B2 | 5/2006 | Marsh et al. | |
| 7,069,452 B1 | 6/2006 | Hind et al. | |
| 7,089,547 B2 | 8/2006 | Goodman et al. | |
| 7,127,599 B2 | 10/2006 | Brice et al. | |

(Continued)

OTHER PUBLICATIONS

U.S. Official Action dated May 11, 2011 in U.S. Appl. No. 11/478,981, filed Jun. 30, 2006, First Named Inventor: Purandhar Nallagatla.

(Continued)

*Primary Examiner* — M Elamin
(74) *Attorney, Agent, or Firm* — Hope Baldauff, LLC (57) ABSTRACT

Methods, systems, apparatus, and computer-readable media for customizing a computer system firmware image utilizing a firmware configuration data structure. At least one firmware configuration data structure is created in a firmware image. Each data structure contains configuration data stored within a data field. A data structure signature identifying the data structure is stored within a data field of the data structure. A pointer to the configuration data within the data structure is stored in at least one firmware program module. An application may search for a firmware configuration data structure according to the data structure signature and content signatures corresponding to specific data entries, retrieve the applicable data structure and data entry, and store modifications to data stored therein.

17 Claims, 4 Drawing Sheets

(56) References Cited

U.S. PATENT DOCUMENTS

| | | | |
|---|---|---|---|
| 7,146,609 | B2 | 12/2006 | Thurston et al. |
| 7,171,658 | B2 | 1/2007 | Ha |
| 7,178,141 | B2 | 2/2007 | Piazza |
| 7,203,723 | B2 | 4/2007 | Ogawa |
| 7,243,347 | B2 | 7/2007 | Palmer et al. |
| 7,284,085 | B2 * | 10/2007 | Netter et al. ............... 711/103 |
| 7,299,463 | B2 | 11/2007 | Brannock et al. |
| 7,305,668 | B2 | 12/2007 | Kennedy et al. |
| 7,313,685 | B2 | 12/2007 | Broyles et al. |
| 7,337,309 | B2 | 2/2008 | Nguyen et al. |
| 7,373,432 | B2 | 5/2008 | Rapp et al. |
| 7,376,943 | B2 | 5/2008 | Lu |
| 7,376,944 | B2 | 5/2008 | Crisan et al. |
| 7,409,685 | B2 | 8/2008 | Chen et al. |
| 7,421,688 | B1 | 9/2008 | Righi et al. |
| 7,480,907 | B1 | 1/2009 | Marolia et al. |
| 7,543,048 | B2 | 6/2009 | Rothman et al. |
| 7,555,750 | B1 | 6/2009 | Lilley |
| 7,558,867 | B2 | 7/2009 | Le et al. |
| 7,590,835 | B1 * | 9/2009 | Nallagatla et al. ............... 713/1 |
| 7,657,886 | B1 | 2/2010 | Chen et al. |
| 7,774,596 | B2 | 8/2010 | Flynn |
| 7,797,696 | B1 * | 9/2010 | Nallagatla et al. ............ 717/168 |
| 7,814,474 | B2 | 10/2010 | Chen et al. |
| 8,032,881 | B2 | 10/2011 | Holmberg et al. |
| 8,037,198 | B2 | 10/2011 | Le et al. |
| 8,136,108 | B2 | 3/2012 | Ha et al. |
| 8,229,227 | B2 | 7/2012 | Stojancic et al. |
| 8,261,256 | B1 | 9/2012 | Adler et al. |
| 2001/0042243 | A1 | 11/2001 | Fish et al. |
| 2003/0145008 | A1 | 7/2003 | Burrell |
| 2003/0217193 | A1 * | 11/2003 | Thurston et al. ............ 709/321 |
| 2004/0030875 | A1 | 2/2004 | Qureshi et al. |
| 2004/0158828 | A1 | 8/2004 | Zimmer et al. |
| 2004/0162975 | A1 | 8/2004 | Yakovlev |
| 2004/0162976 | A1 | 8/2004 | Yakovlev |
| 2005/0108700 | A1 | 5/2005 | Chen et al. |
| 2005/0120384 | A1 | 6/2005 | Stone et al. |
| 2006/0122945 | A1 | 6/2006 | Ripberger et al. |
| 2007/0055794 | A1 | 3/2007 | Chuang et al. |
| 2007/0214453 | A1 | 9/2007 | Dive-Reclus |
| 2007/0274230 | A1 | 11/2007 | Werber et al. |

OTHER PUBLICATIONS

U.S. Notice of Allowance / Allowability dated May 4, 2010 in U.S. Appl. No. 11/479,923.

Cieslicki et al., "Efficient updates in highly available distributed random access memory," 2006, IEEE, ICPADS, pp. 1-6.

Kim et al., "Remoate progressive firmware update for flash based networked embedded systems," 2009, ACM ISLPED, pp. 407-412.

Kumar et al., "Dynamic memory management for programmable devices," 2002, ACM ISMM, pp. 139-149.

Tiwari et al., "A small cache of large ranges: Hardware methods for efficiently searching, storing and updating big dataflow tags," 2008, IEEE, pp. 94-105.

U.S. Official Action dated Feb. 27, 2012 in U.S. Appl. No. 11/478,981, filed Jun. 30, 2006, First Named Inventor: Purandhar Nallagatla.

U.S. Appl. No. 12/849,347, filed Aug. 3, 2010 entitled "Dynamically Updating a Computer System and Firmware Image Utilizing an Option Read Only Memory (OPROM) Data Structure," Inventors: Nallagatla et al.

U.S. Official Action dated Dec. 1, 2010 in U.S. Appl. No. 11/478,981.

U.S. Appl. No. 11/478,981, filed Jun. 30, 2006, entitled "Uniquely Identifying and Validating Computer System Firmware," Inventors: Nallagatla et al.

U.S. Appl. No. 11/479,923, filed Jun. 30, 2006, entitled "Dynamically Updating a Computer System and Computer System Firmware Image Utilizing an Option ROM Data Structure," Inventors: Nallagatla et al.

U.S. Official Action dated Jan. 2, 2009, in U.S. Appl. No. 11/479,725.

U.S. Notice of Allowance / Allowability dated May 19, 2009 in U.S. Appl. No. 11/479,725.

U.S. Official Action dated Nov. 25, 2009 in U.S. Appl. No. 11/479,923.

U.S. Official Action dated Dec. 5, 2012 in U.S. Appl. No. 11/478,981, filed Jun. 30, 2006, First Named Inventor: Purandhar Nallagatla.

U.S. Official Action dated Dec. 17, 2012 in U.S. Appl. No. 12/849,347, filed Aug. 3, 2010, First Named Inventor: Purandhar Nallagatla.

U.S. Official Action dated Aug. 2, 2013 in U.S. Appl. No. 11/478,981, filed Jun. 30, 2006, First Named Inventor: Purandhar Nallagatla.

Ben-Aroya et al., "Competitive Analysis of Flash Memory Algorithms", ACM Trans. On Algorithms, Mar. 2011, vol. 7, Article 23, pp. 1-37.

Chen et al., "Understanding Intrinsic Characteristics and System Implications of Flash Memory Based Solid State Drives", SIGMETRICS/Performance '09, Jun. 15-19, 2009, ACM 2009, pp. 181-192.

Bencsath et al., "XCS Based Hidden Firmware Modification on Embedded Devices", IEEE 2011, pp. 1-5.

Li et al., "FEMU A Firmware Based Emulation Framework for SoC Verification", ISSS'10 Oct. 24-29, 2010, Scottsdale, AZ, USA, Copyright 2010, ACM 2010, pp. 257-266.

U.S. Notice of Allowance/Allowability dated Jun. 4, 2013 in U.S. Appl. No. 12/849,347, filed Aug. 3, 2010, First Named Inventor: Purandhar Nallagatla.

* cited by examiner

| | FIELD | CONTENT SIGNATURE | | DATA TYPE | |
|---|---|---|---|---|---|
| 302 | STRUCT SIGNATURE | | | UNIT 32 | 320 |
| 304 | STRUCT VERSION | | | UINT 8 | 322 |
| 306 | SIZE | | | UINT 16 | 324 |
| 308 | NAME STRING | | | CHAR 8 | 326 |
| 310A | ENTRY | 340A | AAAA | PCI_ENTRY | 328 |
| 310B | ENTRY | 340B | BBBB | PCI_ENTRY | 330 |
| 310N | ENTRY | 340N | NNNN | PCI_ENTRY | 332 |
| 312A | FFFFFFF | | | PCI_ENTRY | 334 |
| 312B | FFFFFFF | | | PCI_ENTRY | 336 |
| 312N | FFFFFFF | | | PCI_ENTRY | 338 |

DYNAMICALLY UPDATING A COMPUTER SYSTEM FIRMWARE IMAGE

CROSS-REFERENCE TO RELATED APPLICATIONS

This patent application is a continuation of U.S. patent application Ser. No. 11/479,725, entitled "Dynamically Updating a Computer System Firmware Image," filed Jun. 30, 2006, now U.S. Pat. No. 7,590,835 which is expressly incorporated herein by reference in its entirety. This application is also related to U.S. copending patent application Ser. No. 11/478,981, filed on Jun. 30, 2006 and entitled "Uniquely Identifying And Validating Computer System Firmware," and U.S. patent application Ser. No. 11/479,923, filed on Jun. 30, 2006 now U.S. Pat. No. 7,797,696 and entitled "Dynamically Updating a Computer System and Computer System Firmware Image Utilizing an Option ROM Data Structure," which are both expressly incorporated herein by reference in their entirety.

BACKGROUND

Computing systems often utilize firmware that is stored in a non-volatile memory device, such as a read-only memory ("ROM") device or a non-volatile random access memory ("NVRAM") device. The firmware provides program code for performing power-on self tests, booting, and for providing support to the operating system and other functions. When computer systems are designed, there are many different combinations of hardware devices that may be present in the computer system or on a computer system motherboard. To support such a wide variety of hardware combinations, the motherboard manufacturers often provide original equipment manufacturers ("OEMs") with a reference board and corresponding firmware image that represents the most common motherboard chipset configuration.

The reference board provides an OEM with a proof of concept that the OEM will then customize according to their requirements. The OEM may add, remove, or interchange hardware components to and from the reference board according to desired hardware configurations. As various hardware components are added or removed from a computer system motherboard, the firmware image must be updated to reflect the configuration change in order for the modified chipset configuration to properly function. The OEM must then request a firmware image that corresponds to the specific components of the customized motherboard. The customized firmware image is created and provided to the OEM for flashing into a memory device and distribution with the OEM's customized motherboard. This firmware customization process consumes time and resources as the firmware image is created by a manufacturer, delivered to an OEM, returned to the manufacturer for customization, modified by the manufacturer, and returned to the OEM.

It is with respect to these considerations and others that the various embodiments of the invention have been made.

SUMMARY

In accordance with present embodiments described herein, the above and other problems are solved by methods, apparatus, systems, and computer-readable media for dynamically updating a computer system firmware image. Through the embodiments, one or more firmware configuration data structures facilitate firmware image modifications prior to creating a computer system firmware, enabling a customized firmware to be created without requiring the aid of the firmware manufacturer. According to implementations described herein, a firmware image includes one or more firmware configuration data structures and one or more firmware program modules. The firmware configuration data structures store configuration data that may be customized by a party prior to flashing the firmware image to create a customized computer system firmware. Program modules within the firmware image include pointers to the configuration data within the firmware configuration data structures, allowing for the firmware image to be modified without modifying the program modules within the firmware image.

According to one implementation described herein, a method is provided for customizing a computer system firmware image. According to the method, at least one firmware configuration data structure storing configuration data is created. A data structure signature identifying the firmware configuration data structure is stored within a data field of each data structure. Additionally, a pointer is stored in at least one firmware program module, pointing the program code within the program module to the configuration data stored within the firmware configuration data structure.

According to other aspects of the method, a search is conducted for the data structure signature. The firmware configuration data structure located from the data structure signature is retrieved, and the stored configuration data is modified. Retrieving the firmware configuration data structure may include displaying a set of user-selectable options corresponding to data fields within the firmware configuration data structure. A selection is received from a user and the configuration data corresponding to the selected data field is displayed for modification by the user. Further aspects of the method include storing content signatures with each data entry within the firmware configuration data structure. The firmware configuration data structure may be searched for these content signatures to target specific data entries rather than the entire data structure. Firmware configuration data structures may be populated with chipset register data, interrupt request ("IRQ") routing data, or strings to be displayed during execution of the computer system firmware.

According to yet another aspect, a memory for storing a firmware image for creating a computer system firmware is provided. The firmware image includes a firmware configuration data structure with an array of data fields. The data fields are populated by a data structure signature and configuration data. The data structure signature identifies the firmware configuration data structure, while the configuration data provides customizable data entries. The firmware image further includes a firmware program module that has a pointer that references the configuration data stored within the firmware configuration data structure.

Aspects of the invention may also be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the disclosure presented herein, will be apparent from a reading of the following detailed description and a review of the associated drawings.

DETAILED DESCRIPTION

Embodiments of the present invention provide methods, apparatus, systems, and computer-readable media for customizing computer system firmware. According to implementations described herein, a firmware image includes one or more firmware configuration data structures and one or more firmware program modules. The firmware configuration data structures store configuration data that may be customized by a party prior to flashing the firmware image to create a customized computer system firmware. The firmware program modules include pointers to the configuration data within the firmware configuration data structures, allowing for the firmware image to be modified without modifying the program modules within the firmware image.

As discussed briefly above, firmware is typically shipped with a reference board to an OEM. The OEM may reconfigure the reference board prior to selling the board with an OEM product. The reconfiguration is often minimal, but still requiring a corresponding firmware reconfiguration such as modifying registers, modifying the IRQ routing, or modifying one or more ASCII strings to display an OEM trademark during the boot process. Rather than requiring the OEM to return the firmware to the manufacturer for reconfiguration, the implementations described herein provide one or more firmware configuration data structures that allow changes to be made to a firmware image that alter the behavior of the firmware, but after the firmware has been built and without modifying the firmware source code of the firmware program modules.

In the following detailed description, references are made to the accompanying drawings that form a part hereof, and in which are shown by way of illustration specific embodiments or examples. Referring now to the drawings, in which like numerals represent like elements throughout the several figures, the exemplary operating environment and several illustrative implementations will be described.

Figure 1:
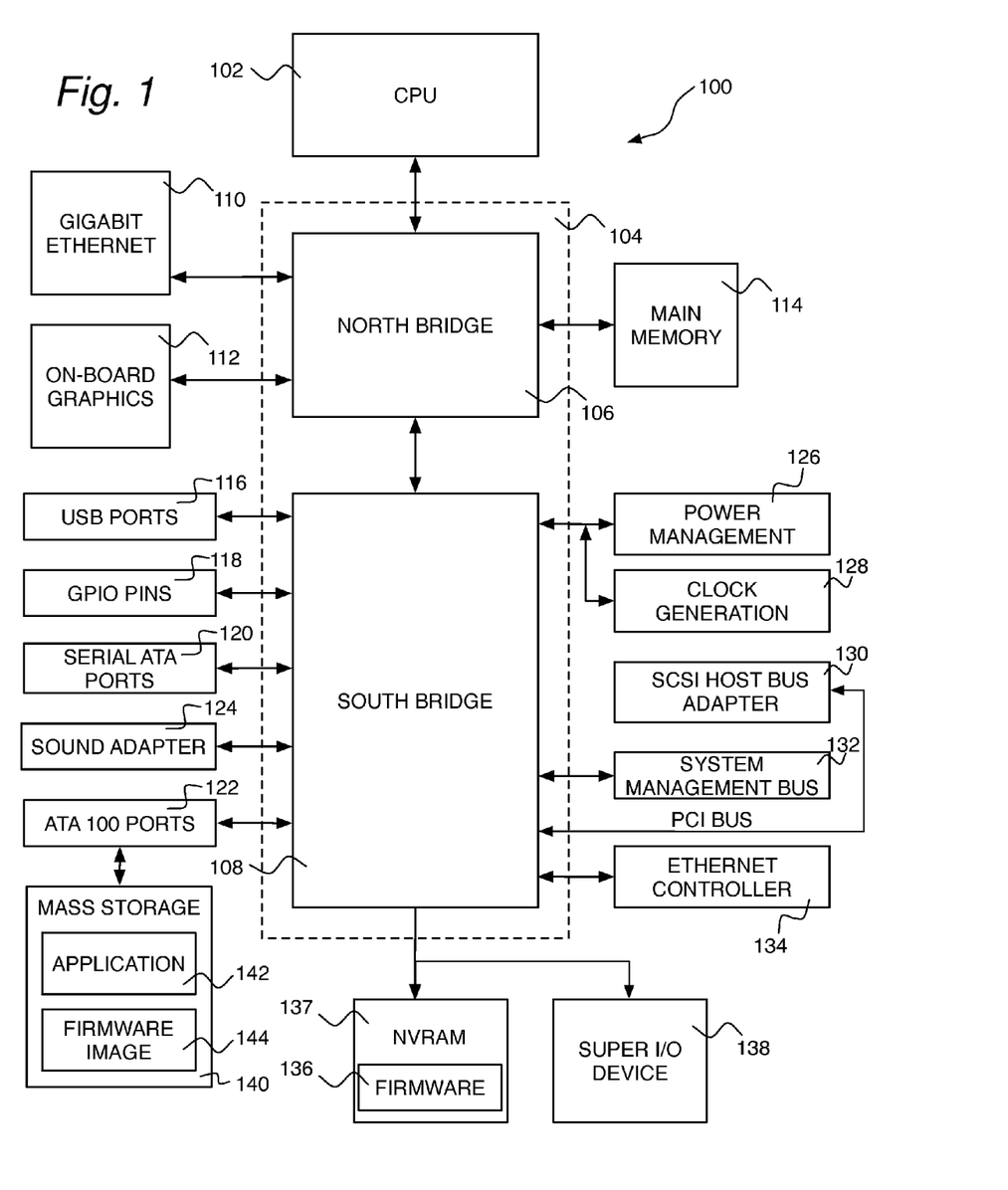
FIG. 1 is a computer architecture diagram that illustrates various components of a computer that provides an illustrative operating environment.

FIG. 1 and the following discussion are intended to provide a brief, general description of a suitable computing environment in which the disclosure presented herein may be implemented. While the embodiments described herein will be described in the general context of program modules that execute in conjunction with the execution of a computer firmware, those skilled in the art will recognize that they may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the disclosure presented herein will be described. It should be appreciated that although the embodiments described herein are discussed in the context of a conventional desktop or server computer, the embodiments may be utilized with virtually any type of computing device. FIG. 1 shows an illustrative computer architecture for a computer 100 that is operative to enable the creation of a firmware configuration data structure that may be used to customize the computer system firmware.

In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to a random access memory ("RAM") used as the main memory 114 in the computer 100 and, possibly, to an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a BIOS boot system compliant SCSI host bus adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("SATA") adapter for providing one or more serial ATA ports 120 and an ATA 100 adapter for providing one or more ATA 100 ports 122. The serial ATA ports 120 and the ATA 100 ports 122 may be, in turn, connected to one or more mass storage devices 140. Mass storage device 140 may store an operating system, application programs, and a firmware image 144.

As known to those skilled in the art, an operating system comprises a set of programs that control operations of a computer and allocation of resources. An application program is software that runs on top of the operating system software and uses computer resources made available through the operating system to perform application specific tasks desired by the user. A firmware image is firmware data that is written, or flashed, to a programmable non-volatile memory device, such as NVRAM 137. According to an embodiment described below, mass storage device 140 stores an application program 142 and a firmware image 144. As will be described in greater detail below, the application program 142 is used to search the firmware image 144 for a unique signature that identifies a firmware configuration data structure that contains firmware configuration data that may be modified according to the needs of a user.

The mass storage devices connected to the south bridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") for storing the firmware 136 that includes program code containing the basic routines that help to start up the computer 100 and to transfer information between elements within the computer 100. The firmware 136 may comprise a firmware that is compatible with the Extensible Firmware Interface ("EFI") specification. The firmware 136 may also comprise a Basic Input/Output System ("BIOS") firmware. The LPC interface may also be utilized to connect a NVRAM 137 to the computer 100. In one embodiment, the NVRAM 137 may also be utilized by the firmware 136 to store configuration data and other kinds of data for the computer 100. It should be appreciated that the configuration and other data for the computer 100 may be stored on the same NVRAM device as the firmware 136. It should also be appreciated that the firmware 136 may be stored on ROM or other non-volatile memory device.

According to an embodiment described herein, the CPU 102 may comprise a general purpose microprocessor from INTEL CORPORATION. For instance, the CPU 102 may comprise a PENTIUM 4 or XEON microprocessor from INTEL CORPORATION. It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
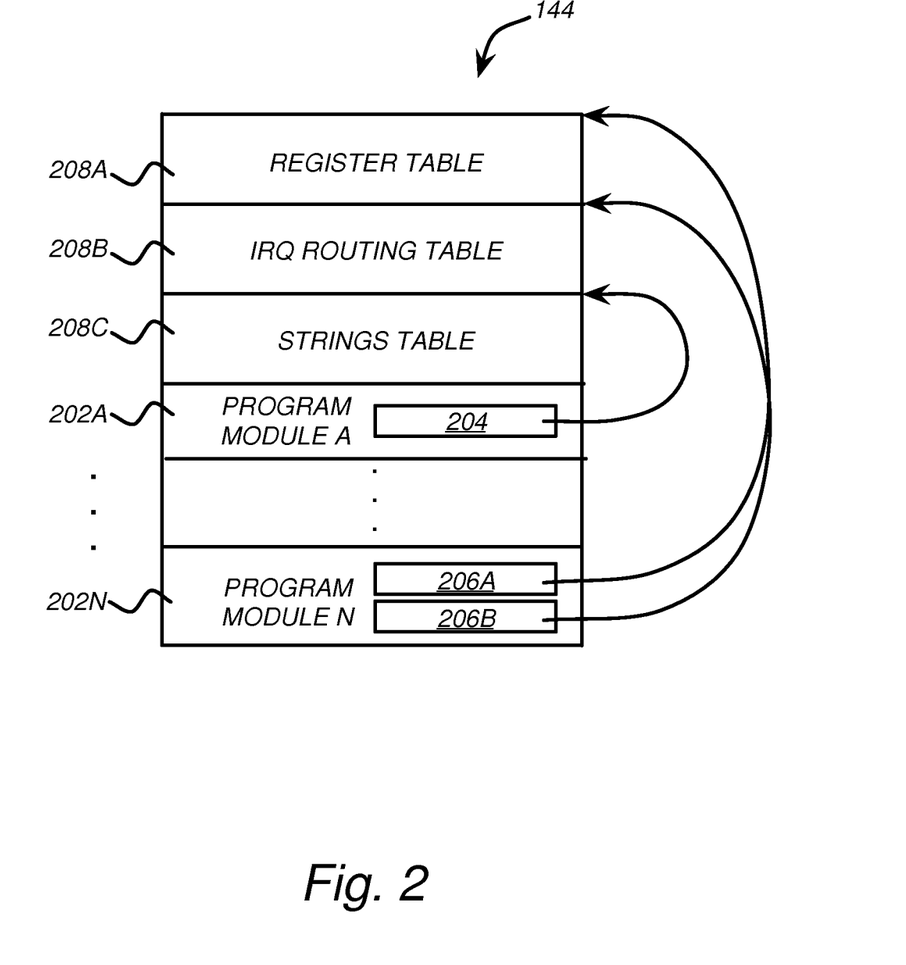
FIG. 2 is a block diagram illustrating components of a computer system firmware image according to one embodiment.

Referring now to FIG. 2, additional details will be provided regarding the embodiments for customizing a computer system firmware. In particular, FIG. 2 is a block diagram illustrating various firmware image components. The firmware image 144 is made up of any number of firmware program modules 202A-202N. Each firmware program module 202 consists of a collection of routines and data structures that performs a particular task. Each firmware program module 202 has at least one interface that lists the constants, data types, variables, and routines that can be accessed by other firmware program modules or routines, as well as an implementation that is private and contains the code that implements the routines in the firmware program module. Firmware program module categories and how these modules identify and validate a computer system firmware is described in U.S. patent application Ser. No. 11/478,981, entitled "Uniquely Identifying and Validating Computer System Firmware," filed on Jun. 30, 2006, which is herein incorporated by reference in its entirety.

According to implementations described herein, firmware image 144 also includes one or more firmware configuration data structures 208A-208C. The firmware configuration data structures 208A-208C store configuration data that may be customized. As will be discussed in detail below with respect to FIG. 3, a firmware configuration data structure 208A-208C consists of an array of data entries. The data entries may include various data fields that may be customized according to a desired board configuration. In order for a firmware configuration data structure 208 to be effectively utilized to allow modification of firmware configuration parameters without modifying firmware source code, the program code in the firmware must be flexible enough to refer to the data within the firmware configuration data structure. For this reason, the program modules 202A-202N utilize pointers 204 and 206A-206B that refer to the firmware configuration data structures 208. These pointers 204 and 206A-206B refer to the data entries stored within the firmware configuration data structures 208 in order to locate the parameters necessary to support the applicable computer system hardware devices. It should be understood that the program modules 202A-202N may alternatively locate the data in the firmware configuration data structures 208A-208C by searching for a unique firmware data structure signature in the same manner that an application 142 may do so. This process is described in detail below with respect to FIGS. 3 and 4.

There may be multiple firmware configuration data structures 208A-208C depending on the type of configuration data stored within each data structure. FIG. 2 illustrates an implementation with three firmware configuration data structures 208A-208C within firmware image 144. The first data structure 208A includes one or more register tables. A register table is a table of data entries used to program chipset registers. As the chipset configuration of a board changes, then modifications to the register table must be made to correspond to the new chipset configuration. A second firmware configuration data structure 208B includes one or more IRQ routing tables. As components are added or removed from the board, the IRQ routing table must be updated to ensure proper routing of interrupt requests according to the current component configuration.

It may also be desirable to customize a computer system firmware to add, delete, or modify ASCII strings that are displayed for a user when a computer system boots. For example, it might be desirable for an OEM to make modifications to a computer system firmware such that the OEM's name or trademark is prominently displayed on a display screen during a computer system boot sequence. To facilitate this modification, implementations described herein provide for one or more firmware configuration data structures 208C containing ASCII strings stored within an array of data fields.

These firmware configuration data structures 208A-208C may be built into separate sections of firmware image 144, so as to be accessible to an external application 142 capable of searching for and modifying each firmware configuration data structure 208A-208C. As discussed above, each program module 202A-202N contains one or more pointers 204 and 206A-206B referencing a corresponding firmware configuration data structure 208A-208C where the applicable customized data may be found. As seen in FIG. 2, program module 202A includes a pointer to firmware configuration data structure 208C, the strings table. Similarly, program module 202N contains two pointers, 406A and 406B, pointing to firmware configuration data structures 208A and 208C containing a register table and a IRQ routing table, respectively.

TABLE 1 shows program code for implementing a firmware configuration data structure 208 according to one embodiment described herein. This program code defines a firmware configuration data structure 208 similar to the one shown in FIG. 3. The program code defines data fields for data corresponding to a data structure signature, a data structure version identifier, a name string, a data structure size indicator, and configuration data entries.

TABLE 1

Figure 3:
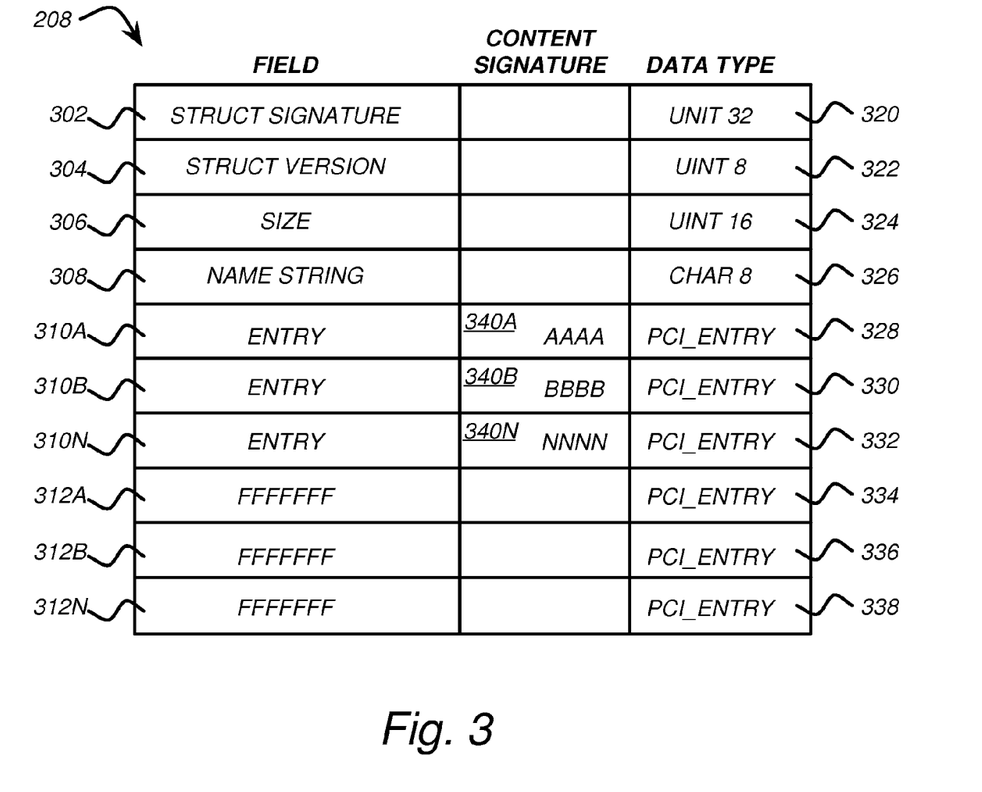
FIG. 3 is a block diagram illustrating a firmware configuration data structure according to one embodiment.

```
typedef struct{
UINT32       Signature; //Signature '$$CT'
UINT8        StructVersion;
CHAR8        NameString;
UINT16       Size;
PCI_ENTRY    PciEntries;
}FW_VERSION
```

Turning now to FIG. 3, a sample firmware identification data structure 208 includes data fields 302-308, each having identification information corresponding to the firmware configuration data structure. Data field 302 stores a signature of the firmware configuration data structure. This signature may be used by an application 142 in searching for the firmware configuration data structure. For example, an OEM may choose to modify a register as a result of changing a chipset configuration on a reference board. To do so, an application 142 is used to search for a unique signature associated with the firmware configuration data structure 208 corresponding to the registers that may be modified. The signature of a firmware configuration data structure created using the code of TABLE 1 is "$$CT." The signature stored in data field 302 may also be used by an application 142 in conjunction with a name string stored in data field 308 when searching for the data structure. It should be understood that any unique identifiers, including globally unique identifiers ("GUIDs"), may be used for searching and locating a firmware configuration data structure. Data fields 320-338 define the type of data entered into data fields 302-312N.

The firmware configuration data structure 208 may also contain a structure version identifier stored in data field 304 that identifies the version of the firmware configuration data structure. This structure version identifier stored in field 304 is updated when the firmware configuration data structure 208 is updated. The firmware configuration data structure 208 may additionally include data stored in a field 306 that defines the size of the firmware configuration data structure. Data fields 310A-310N store configuration data entries for customizing the firmware image 144. These entries include the configuration data that is being customized by an OEM or other party. These entries may be fixed in length to facilitate the ability of an application 142 to locate the entry during a search.

There is one entry per register in a firmware configuration data structure 208 containing configurable register data. Therefore, if there were ten registers, then the firmware configuration data structure 208 would include an array of data fields having ten entries. Each entry contains information pertaining to the data that may be modified or that is useful to the firmware program module that refers to this data. As an example, in addition to the configuration data to be modified, each entry may have a number of the bus on which a component is located, a device and function number of the corresponding component, as well as a PCI register offset. It should be appreciated that the format, order, type, and quantity of the data stored within the fields of the firmware configuration data structure 208 may vary.

Each entry in data fields 310A-310N may include a content signature as seen in data fields 340A-340N, respectively. A content signature serves a similar purpose as a structure signature; however, the content signature identifies a single entry or subset of entries, rather than the data structure as a whole. A content signature may be used independently to assist an application 142 in directly locating a single register or other data located within a firmware configuration data structure 208, or may be used in conjunction with a structure signature, name string, GUID, or any combination thereof for the same purpose. Utilizing a structure signature and content signatures will be described in detail below with respect to FIG. 4. It should be appreciated that the firmware configuration data structure 208 may include any number of data fields for storing any amount and type of data that may be pertinent to an application 142 searching the data structure or to a firmware program module utilizing the data.

Figure 4:
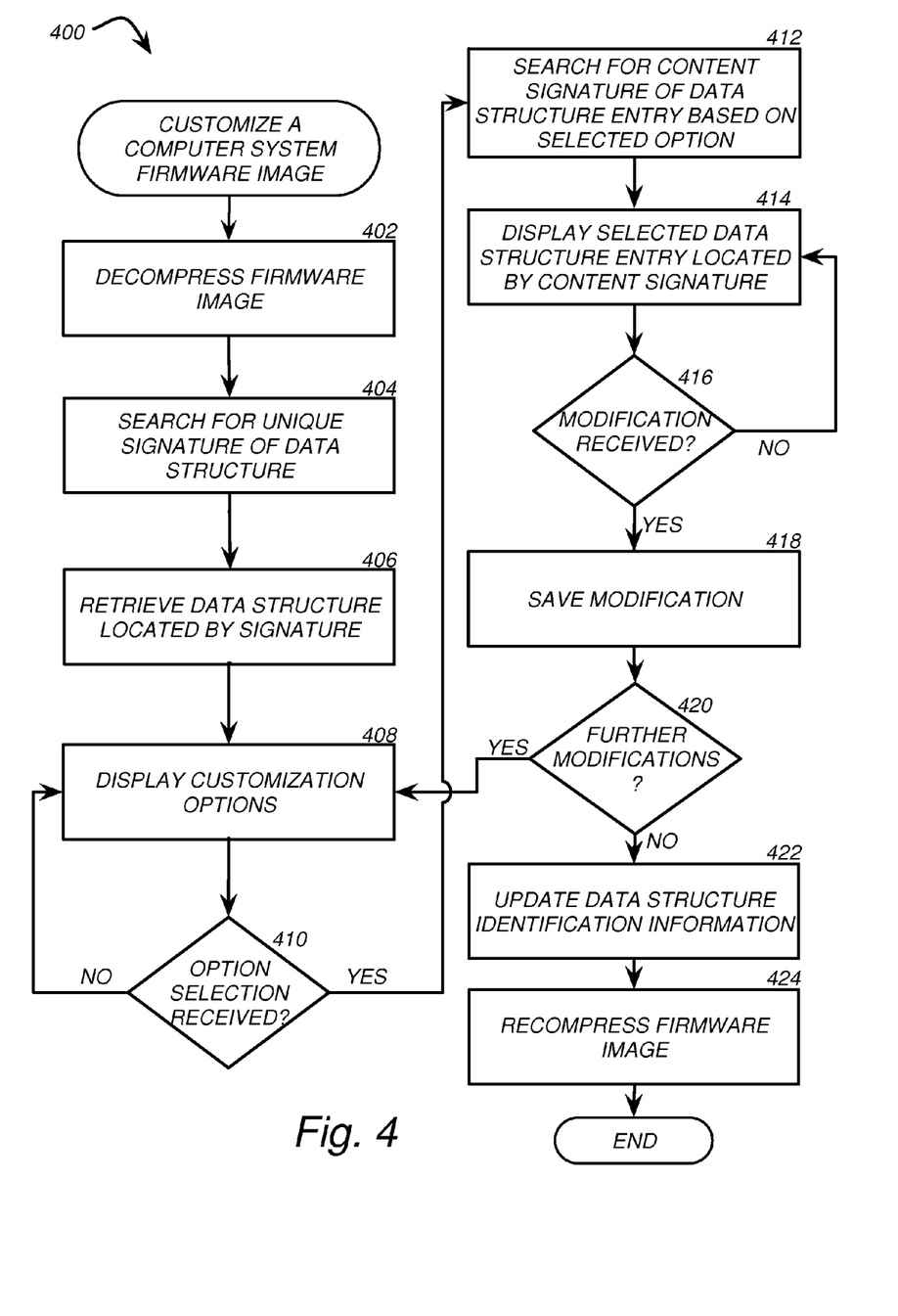
FIG. 4 is a flow diagram showing a process for customizing a computer system firmware image according to one embodiment.

Turning now to FIG. 4, an illustrative routine 400 will be described in detail for customizing a computer system firmware. The logical operations of the various embodiments disclosed herein are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the embodiments described herein. Accordingly, the logical operations making up the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Routine 400 is performed by application program 142. It should be understood that application 142 may be pre-programmed to execute the entire routine 400 without additional user input, or may provide one or more interfaces for receiving user input at any operation of the routine. The routine 400 begins at operation 402, where the computer system firmware is decompressed. The routine 400 continues to operation 404, where a search of a memory device is conducted to locate a unique signature associated with a firmware configuration data structure 208. It should be appreciated that the data structure is targeted according to the desired firmware modifications. If a party changes a component on the reference board, then corresponding changes must be made to the computer system firmware image 144. The party may manually select the firmware configuration data structures 208A-208C to modify, or the applicable data structures may be selected by an application 142 programmed with this information. A search is then conducted for the data structure signature corresponding to any applicable firmware configuration data structures 208. Each applicable firmware configuration data structure 208 located by the unique signature is retrieved at operation 406.

The routine 400 continues from operation 406 to operation 408, where the customization options are displayed. It should be appreciated that the customization options, and any other information described here as being displayed, may not be displayed if the routine is being carried out by a pre-programmed application 142 as opposed to execution of the routine that requires real-time user input. The customization options may be displayed as a graphical user interface ("GUI") with any number of selectable options pertaining to the specific data structure entries that are targeted for customization. For example, a user or application program 142 may choose between options for customizing a specific chipset register, IRQ routing, or string. It should be appreciated that these customization options may be displayed to a user or selected by an application program 142 prior to operation 504, where a search is conducted of the firmware image for a unique signature of a firmware configuration data structure. In this implementation, the firmware image may be searched for the data structure signature and content signature after a single user input requesting the specific data entry for customization.

At operation 410, a determination is made as to whether an option selection was received. If a selection was not received, then the routine 400 returns to operation 408 where the modification options are displayed. If a selection was received at operation 410, then the routine 400 continues to operation 412, where the firmware configuration data structure is searched for a content signature corresponding to the targeted data structure entry. At operation 414, the data structure entry located by the content signature is provided. From operation 414, the routine 400 proceeds to operation 416, where a determination is made as to whether a modification to the data structure entry was received. If a modification was not received, then the routine returns to operation 414, where the data structure entry is provided. If a modification was received, then the routine 400 continues to operation 418, where the modification is saved in the firmware configuration data structure 208, replacing the original entry.

A determination is made at operation 420 as to whether there are further modifications to be made. If further modifications are to be made, the routine 400 returns from operation 420 to operation 408 and the routine continues as described above. If no further modifications are to be made, the routine 400 proceeds to operation 422, where any applicable firmware configuration data structure identification information is updated. This information may include the size of the data structure as well as the version number. From operation 422, the routine continues to operation 424, where the firmware is recompressed and the routine 400 ends.

It should be appreciated that embodiments described herein provide methods, apparatus, systems, and computer-readable media for customizing a computer system firmware utilizing a firmware configuration data structure. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A memory for storing a firmware image for creating a computer system firmware, the firmware image comprising:
   a firmware configuration data structure having an array of data fields populated by
      a data structure signature identifying the firmware configuration data structure,
      configuration data for customizing the computer system firmware, the configuration data comprising strings for display during execution of the computer system firmware created using the firmware image, and
      a plurality of content signatures, wherein each content signature corresponds to a single configuration data entry; and
   a firmware program module having a pointer that references the configuration data stored within the firmware configuration data structure.

2. The memory of claim 1, wherein the configuration data comprises chipset register data.

3. The memory of claim 1, wherein the configuration data comprises IRQ routing data.

4. The memory of claim 1, wherein the firmware configuration data structure further comprises a structure version identifier that identifies a version of the firmware configuration data structure.

5. A system for creating a computer system firmware, the system comprising:
   a processor;
   a memory coupled to the processor; and
   a firmware image stored on the memory, the firmware image comprising
      a firmware configuration data structure comprising a plurality of content signatures, each content signature of the plurality of content signatures corresponding to a configuration data entry, and further comprising an array of data fields populated by
         a data structure signature identifying the firmware configuration data structure, and
         configuration data for customizing the computer system firmware, and
      a firmware program module having a pointer that references the configuration data stored within the firmware configuration data structure.

6. The system of claim 5, wherein the configuration data comprises chipset register data.

7. The system of claim 5, wherein the configuration data comprises IRQ routing data.

8. The system of claim 5, wherein the configuration data comprises strings for display during execution of the computer system firmware created using the firmware image.

9. The system of claim 5, wherein the array of data fields further populated by a plurality of content signatures, each content signature corresponding to a configuration data entry within the firmware configuration data structure.

10. The system of claim 5, wherein the firmware configuration data structure further comprises a structure version identifier that identifies a version of the firmware configuration data structure.

11. A system for creating a computer system firmware, the system comprising:
    a processor;
    a memory coupled to the processor; and
    a firmware image stored on the memory, the firmware image comprising
        a firmware configuration data structure comprising an array of data fields populated by
            a data structure signature identifying the firmware configuration data structure,
            configuration data for customizing the computer system firmware, and
            a plurality of content signatures, each content signature of the plurality of content signatures corresponding to a configuration data entry within the firmware configuration data structure, and
        a firmware program module having a pointer that references the configuration data stored within the firmware configuration data structure.

12. The system of claim 11, wherein the firmware configuration data structure further comprises a structure version identifier that identifies a version of the firmware configuration data structure.

13. The system of claim 11, wherein the configuration data comprises chipset register data.

14. The system of claim 11, wherein the configuration data comprises IRQ routing data.

15. The system of claim 11, wherein the configuration data comprises strings for display during execution of the computer system firmware created using the firmware image.

16. The system of claim 11, wherein the firmware configuration data structure further comprises a plurality of content signatures, wherein each content signature corresponds to a single configuration data entry.

17. A memory for storing a firmware image for creating a computer system firmware, the firmware image comprising:
    a firmware configuration data structure having an array of data fields populated by
        a data structure signature identifying the firmware configuration data structure,
        configuration data for customizing the computer system firmware, the configuration data comprising strings for display during execution of the computer system firmware created using the firmware image, and
        a plurality of content signatures, each content signature corresponding to a configuration data entry within the firmware configuration data structure; and
    a firmware program module having a pointer that references the configuration data stored within the firmware configuration data structure.

* * * * *